United States Patent
Minamida et al.

(10) Patent No.: US 7,612,151 B2
(45) Date of Patent: Nov. 3, 2009

(54) MOISTURE-CURABLE POLYURETHANE HOT-MELT ADHESIVE

(75) Inventors: Yukihiko Minamida, Osaka (JP); Masayoshi Imanaka, Osaka (JP); Toshio Niwa, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/599,705

(22) PCT Filed: Apr. 7, 2005

(86) PCT No.: PCT/JP2005/006864
§ 371 (c)(1), (2), (4) Date: Oct. 5, 2006

(87) PCT Pub. No.: WO2005/097933
PCT Pub. Date: Oct. 20, 2005

(65) Prior Publication Data
US 2007/0232764 A1 Oct. 4, 2007

(30) Foreign Application Priority Data
Apr. 9, 2004 (JP) .............................. 2004-115332

(51) Int. Cl.
- C08G 18/10 (2006.01)
- C08G 18/42 (2006.01)
- C08G 18/48 (2006.01)
- C09J 175/04 (2006.01)

(52) U.S. Cl. ...................... 525/453; 524/589; 524/590; 525/452; 525/403

(58) Field of Classification Search ................. 525/453, 525/452, 403, 440; 524/589, 590
See application file for complete search history.

(56) References Cited

U.S. PATENT DOCUMENTS

| | | | | |
|---|---|---|---|---|
| 4,312,973 | A * | 1/1982 | Critchfield et al. | 528/75 |
| 6,093,270 | A * | 7/2000 | Ferencz et al. | 156/73.5 |
| 6,221,978 | B1 * | 4/2001 | Li et al. | 525/452 |
| 6,713,570 | B2 * | 3/2004 | Tangen | 525/458 |
| 6,844,073 | B1 * | 1/2005 | Helmeke et al. | 428/423.1 |

FOREIGN PATENT DOCUMENTS

| | | | |
|---|---|---|---|
| CA | 1337093 | C | 9/1995 |
| JP | 4-28783 | A | 1/1992 |
| JP | 5-51573 | A | 3/1993 |
| JP | 6-78515 | B2 | 10/1994 |
| JP | 2001-3030 | A | 1/2001 |
| JP | 2002-194318 | A | 7/2002 |
| JP | 3482609 | B2 | 10/2003 |
| JP | 2003-327647 | A | 11/2003 |
| JP | 2005-23181 | A | 1/2005 |

OTHER PUBLICATIONS

Degussa DYNACOLL product data sheet.*
Machine Translation of JP 5-51573.*
Degussa Dynacoll Product Data Sheet. 2007.*
Machine Translation of JP 5-51573. 1993.*
International Search Report for PCT/JP2005/006864 completed Jun. 29, 2005.
Patent Abstracts of Japan for JP2002-194318 published Jul. 10, 2002.
Patent Abstracts of Japan for JP2003-327647 published Nov. 19, 2003.
Patent Abstracts of Japan for JP4-28783 published Jan. 31, 1992.
Patent Abstracts of japan for JP5-51573 published Mar. 2, 1993.

* cited by examiner

*Primary Examiner*—Mark Eashoo
*Assistant Examiner*—Noah Frank
(74) *Attorney, Agent, or Firm*—Darby & Darby P.C.

(57) ABSTRACT

A moisture-curable polyurethane hot-melt adhesive, which includes a urethane prepolymer obtained by a reaction between polyisocyanate and polyols, wherein the polyols contain: long-chain aliphatic polyester polyol (A) represented by a general formula (I); aliphatic polyether polyol (B) having a number average molecular weight of 3,000 to 15,000; and aromatic polyester polyol (CI) which has a number average molecular weight of 1,000 to 5,000 and has a glass-transition temperature of 40° C. or more;

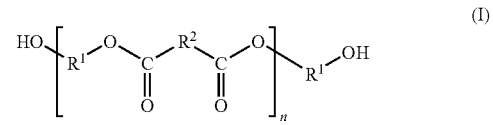

(in the general formula (I), $R^1$ and $R^2$ each independently represent a straight chain alkylene group wherein the number of carbon atoms in the group is an even number, the sum of the number of carbon atoms in $R^1$ and $R^2$ is 12 or more, and n represents a number of 3 to 40).

10 Claims, 2 Drawing Sheets

MOISTURE-CURABLE POLYURETHANE HOT-MELT ADHESIVE

CROSS-REFERENCE TO PRIOR APPLICATION

This is a U.S. National Phase Application under 35 U.S.C. §371 of International Patent Application No. PCT/JP2005/006864 filed Apr. 7, 2005, and claims the benefit of Japanese Patent Application No. 2004-115332, filed Apr. 9, 2004, both of which are incorporated by reference herein. The International Application was published in Japanese on Oct. 20, 2005 as WO 2005/097933 A1 under PCT Article 21(2).

TECHNICAL FIELD

The present invention relates to a moisture-curable polyurethane hot-melt adhesive, which can be used as an adhesive or the like in various fields such as the construction and architectural fields.

BACKGROUND ART

Decorative fixture members have been used widely and generally in the field of building materials due to the demands for making structures and the like more attractive and achieving durability and the like. The decorative fixture members were obtained by pasting a sheet or a film such as a decorative sheet on which decorative color and/or a decorative pattern are formed, on a substrate such as plywood, MDF (medium density fiber board), a particle board and the like.

Substrates generally used for decorative fixture members tend to have complex portions, such as a groove or ditch portion, an "R" portion (the "R" stands for a round form, and the "R" portion means a portion such as a convex curved portion), a reverse "R" portion and the like. Accordingly, it is necessary for the adhesive used for pasting a sheet and a substrate together to have excellent adhesiveness such as that which can prevent peeling of the sheet or the like from complex portions of the substrate. As the aforementioned adhesive, an organic solvent type adhesive and a hot-melt adhesive including a thermoplastic resin as a main component have been used.

However, when the organic solvent type adhesive is used, it is necessary to remove the organic solvent therefrom by a method such as drying conducted in the middle of the manufacturing step of the decorative fixture member, and therefore there are many problems such as a high energy load for evaporating organic solvent, adverse effects on the human body, contamination of the atmosphere or water quality due to the organic solvent and the like. Furthermore, there is a problem that the surface smoothness of the obtained decorative fixture member deteriorates when a part of the organic solvent remains in an adhesive layer used for pasting a sheet or the like on a substrate. On the other hand, it may be possible to solve such problems caused by the organic solvent when the aforementioned hot-melt adhesive is used instead of the organic solvent type adhesive, since the hot-melt adhesive is a solvent-less type adhesive. However, there is a problem that a layer formed from the hot-melt adhesive cannot provide sufficient heat resistance, solvent resistance and the like.

In order to solve the aforementioned problems, various moisture-curable polyurethane hot-melt adhesives have been examined as an adhesive used for decorative fixture members. For example, it has been reported that sufficient adhesive strength can be achieved from the initial stage without decreasing the life of the adhesive after it has been pasted, wherein a moisture-curable polyurethane hot-melt adhesive is used, the adhesive includes a urethane prepolymer having a main chain skeleton formed from an amorphous polymer-polyol, the chain length of the skeleton is extended by specific low-molecular weight glycol and polyisocyanates, and an active isocyanate group exists at terminal ends thereof. For an example, please refer to patent document 1.

However, the adhesive strength which is achieved due to the near completion of a moisture-curing reaction (hereinafter, it is referred to as the "final adhesive strength") of the aforementioned moisture-curable polyurethane hot-melt adhesive is insufficient.

Furthermore, there is a problem that when a sheet or the like is pasted on a substrate having complex portions such as a groove or ditch portion, an "R" portion, a reverse "R" portion and the like, partial peeling of the sheet or the like was caused at complex portions of the substrate within a period from when the sheet is applied to the substrate to until the final adhesive strength is achieved.

Furthermore, it has been reported that excellent initial adhesiveness is achieved due to the use of a moisture-curable polyurethane hot-melt adhesive including a polyurethane resin, which has an isocyanate group at both terminal ends and can be obtained by reacting crystalline aliphatic polyester diol, aromatic polyester diol and diisocyanate. For an example, please refer to patent document 2.

Furthermore, it has been reported that excellent viscosity stability at the time of melting, sufficient initial adhesive strength and sufficient final adhesive strength are achieved due to a moisture-curable polyurethane hot-melt adhesive for a wooden decorative member. The hot-melt adhesive comprises urethane prepolymer wherein the prepolymer is obtained by the reaction between organic polyisocyanate and polymerpolyol which includes crystalline polyol having a number average of 2,000 to 10,000 and amorphous polyol having a number average of 300 to 800. For an example, please refer to patent document 3.

Moreover, it has been reported that a mono-liquid moisture-curable polyurethane resin composition provides almost no reduction in elastic modulus even if heating is conducted subsequent to humidity curing, wherein the composition comprises urethane prepolymer obtained by the reaction between polyisocyanate and a mixture of polyol containing crystalline polyesterpolyol, amorphous polyesterpolyol and/or amorphous polyetherpolyol. These polyols in the resin composition are in a condition that they are mixed with each other due to compatibility. For an example, please refer to patent document 4.

However, even if any of the moisture-curable polyurethane hot-melt adhesives described in patent documents 2 to 4 are use, it is impossible to completely solve problems in that, when a sheet or the like is pasted on a substrate which has complex portions such as a groove or ditch portion, an R portion, a reverse R portion, and the like, unpreferable partial peeling of the sheet or the like is caused at the complex portions of the substrate within a period between the pasting of the sheet to the substrate and when the final adhesive strength is achieved. Furthermore, final adhesive strengths achieved by the adhesives of these documents are still insufficient.

In many cases, a conventional decorative fixture member is manufactured by a method such that adhesive is applied to a substrate or a sheet, the substrate and the sheet are put together, and then pressure is applied thereto for fixing. As a sheet or the like which is generally used in the method, a rolled sheet having connecting portions which exist every hundred meters is used in many cases. However, a decorative fixture member, in which a sheet or the like having a connecting portion is pasted on a substrate, serves as an inferior item, since the appearance of such decorative fixture members is poor. Accordingly, it is important to reduce such inferior items from the viewpoint of saving resources. Furthermore, it is particularly desirable to recycle a substrate by stripping the sheet or the like from a decorative fixture member when it become undesirable, since a substrate is more expensive than the sheet or the like.

However, conventional moisture-curable polyurethane hot-melt adhesives, which have been used for decorative fixture members, are adhesives which have been developed in order to improve initial adhesive strength to prevent the aforementioned problems of the peeling of the sheet or the like from a substrate. Accordingly, there are problems that when a sheet or the like is pasted on a substrate with the aforementioned adhesives, peeling of the sheet from the substrate is difficult after a predetermined period of time has passed, for example after about three minutes passed, it becomes difficult to peel the sheet or the like from the substrate. Furthermore, even if it is possible to peel the sheet or the like from the substrate, there is a problem that the substrate from which the sheet or the like was peeled cannot be recycled since remarkable unevenness is formed on the substrate by the peeling.

Patent document 1: Japanese Unexamined Patent Application, First Publication No. Hei 04-028783
Patent document 2: Japanese Unexamined Patent Application, First Publication No. Hei 05-051573
Patent document 3: Japanese Unexamined Patent Application, First Publication No. 2002-194318
Patent document 4: Japanese Unexamined Patent Application, First Publication No. 2003-327647

DISCLOSURE OF INVENTION

Problems to be Solved by the Invention

An object of the present invention is to provide a moisture-curable polyurethane hot-melt adhesive, which can achieve excellent final adhesive-strength and which does not cause peeling of a sheet or the like from a substrate even from complex portions of the substrate and even when the moisture-curable polyurethane hot-melt adhesive is used for pasting a sheet or the like and a conventional substrate which has complex portions such as a groove or ditch portion, an R portion and a reverse R portion.

Moreover, another object of the present invention is to provide a moisture-curable polyurethane hot-melt adhesive which shows initial adhesive strength sufficient to peel a sheet or the like from a substrate easily without causing problems on the surface thereof when the moisture-curable polyurethane hot-melt adhesive is used for pasting the sheet or the like and the substrate, and peeling is conducted within a predetermined time (for example, within about 5 minutes or less) after pasting.

Means for Solving the Problems

The inventors of the present invention thought that it was important to increase initial adhesive strength of conventionally used moisture-curable polyurethane hot-melt adhesives, and examined the initial adhesive strength. However, it turned out that, if the initial adhesive strength was increased, rather than peeling of the sheet and the like being prevented at the complex positions of the substrate, coating work ability deteriorated due to increased melt viscosity in the adhesive.

The inventors further studied and found that excellent final adhesive strength was achieved and a sheet or the like did not peel from a substrate which included complex portions as those used for conventional decorative fixture members after a long period of time had passed when a specific moisture-curable polyurethane hot-melt adhesive is used for pasting the sheet or the like with the substrate. This occurred when the moisture-curable polyurethane hot-melt adhesive included a urethane prepolymer obtained by a reaction between polyisocyanate and polyols, which were the combination of: long-chain aliphatic polyesterpolyol having a specific structure; aliphatic polyetherpolyol having a number average molecular weight of 3,000 or more, which has a comparatively large molecular weight; and aromatic polyesterpolyol having a glass-transition temperature of 40° C. or more and having a number average molecular weight in a specific range.

The inventors of the present invention also found that, in addition to the aforementioned excellent adhesive strength, the moisture-curable polyurethane hot-melt adhesive achieved by the inventors also makes it possible to reuse the substrate, since the sheet or the like can be peeled off from the substrate easily without causing problems on the surface thereof, as long as peeling is conducted within a predetermined time (for example, about 5 minutes or less) after pasting.

A first aspect of the present invention is a moisture-curable polyurethane hot-melt adhesive which includes urethane prepolymer obtained by a reaction between polyisocyanate and polyols, wherein the polyols comprise long-chain aliphatic polyester polyol (A) represented by the general formula (I); aliphatic polyether polyol (B) having a number average molecular weight of 3,000 to 15,000; and aromatic polyester polyol (CI) which has the number average molecular weight of 1,000 to 5,000 and has a glass-transition temperature of 40° C. or more.

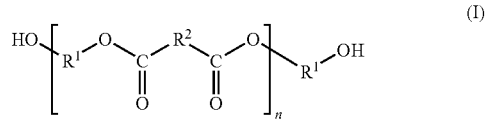

(I)

(In the general formula (I), $R^1$ and $R^2$ each independently represent a straight chain alkylene group wherein the number of carbon atoms in the group is an even number; the sum of the number of carbon atoms in $R^1$ and $R^2$ is 12 or more; and n represents a number from 3 to 40.)

The present invention also provides a decorative fixture member which is obtained by pasting a sheet or film to a substrate using the aforementioned moisture-curable polyurethane hot-melt adhesive.

In the present invention, the glass-transition temperature is a value obtained by the endothermic peak which is detected and measured by a differential scanning calorimeter at a heating rate of 10° C./minute.

Furthermore, "final adhesive strength" used in the present invention means an adhesive strength achieved by the moisture-curing reaction which is almost completely finished after which a moisture-curable polyurethane hot-melt adhesive is coated on a desired material to be coated and pasted on another desired material. Conditions for achieving the "final adhesive strength" change in accordance with the kind of moisture-curable polyurethane hot-melt adhesive used. In general, "final adhesive strength" can be achieved after the pasting, by curing the adhesive at a temperature of 23° C. and a relative humidity of 65% for 24 hours.

Effects of the Invention

When a moisture-curable polyurethane hot-melt adhesive of the present invention is used for pasting, excellent final adhesive strength can be achieved and there is no peeling of the sheet or the like from the substrate even at complex portions of the substrate even when the sheet or a film is pasted to a substrate which has complex portions such as a groove or ditch portion, an R portion or a reverse R portion, by using the adhesive.

Furthermore, while achieving such excellent adhesive ability, it is possible to peel the sheet or the like from the substrate easily without causing problems on the surface of the substrate, as long as peeling is conducted within a predetermined time (for example, about 5 minutes or less) after pasting. Accordingly, it is possible to reuse the substrate.

As described above, the moisture-curable polyurethane hot-melt adhesive of the present invention has excellent characteristics, and therefore there are many merits to using the adhesive in various fields such as the architectural field.

BEST MODE FOR CARRYING OUT THE INVENTION

Figure 1:
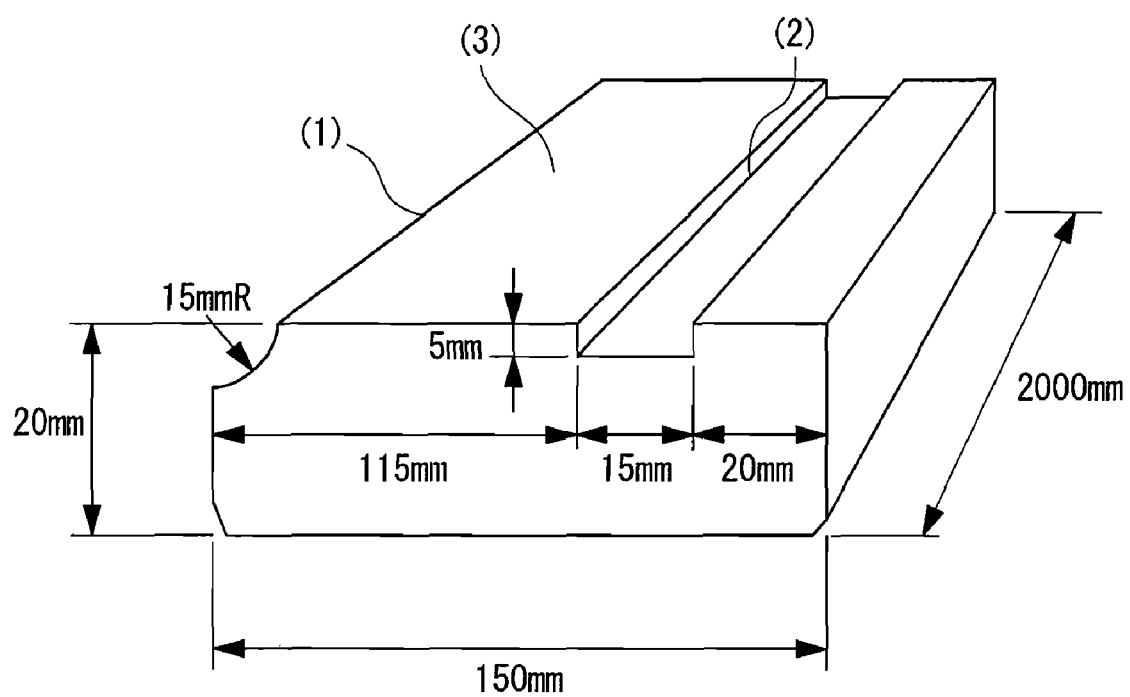
FIG. 1 is a typical view of a substrate.

The moisture-curable polyurethane hot-melt adhesive of the present invention contains a urethane prepolymer as a main component which is a reactant obtained from a reaction between a specific polyol and a polyisocyanate described below, and furthermore it can contain other conventional additives or the like, as required.

The urethane prepolymer included in the moisture-curable polyurethane hot-melt adhesive is in a solid state or viscous state at room temperature, and has an isocyanate group in a molecule thereof. The isocyanate group reacts with the moisture included in the air and/or in a substrate, on which the adhesive is coated, to form a cross-linked structure. Although compounds conventionally known as a urethane prepolymer are those having comparatively low molecular weight, a person with ordinary skill in the art knows that a compound having an average molecular weight (Mn) in the order of several tens of thousands can also be a urethane prepolymer in addition to a urethane prepolymer having the low molecular weight. Accordingly, in the present invention, a urethane prepolymer having an average molecular weight (Mn) of several tens of thousands can also be used as a prepolymer.

The number average molecular weight of the urethane prepolymer is preferably in the range of 500 to 30,000, more preferably 750 to 20,000 and still more preferably 1,000 to 10,000. When the number average molecular weight of the urethane prepolymer used in the present invention is within the aforementioned range, the obtained moisture-curable polyurethane hot-melt adhesive is excellent in fluidity and workability.

The urethane prepolymer used in the present invention has both moisture-crosslinking reactivity and hot-melting properties. The former moisture-crosslinking reactivity of the urethane prepolymer originates from a crosslinking reaction which starts by a reaction between a isocyanate group of the urethane prepolymer and moisture (water). That is, the moisture-crosslinking reactivity originates from the isocyanate group included in the urethane prepolymer.

On the other hand, the latter hot-melt property of the urethane prepolymer originates from the molecular structure of the selected urethane prepolymer. That is, the hot-melting property is a property of a compound which is in a solid state at room temperature but melts when heated, and therefore, after coating the compound in a molten state, adhesiveness can be achieved by solidification caused by cooling.

"Hot melt" is the generic term for a material or characteristic thereof, wherein the material is in a solid or viscous state at room temperature but melts when heated and becomes a liquid or fluid. For example, a hot melt which is an ethylene vinyl acetate based hot melt or the like has been known. The aforementioned hot melt is solventless and has a characteristic such that it is in a solid or viscous state at room temperature, but changes states such that the coating thereof is possible due to melting with heat, and further changing the state such that the cohesive strength increases again due to cooling. Therefore, a hot melt is useful as a solventless adhesive, coating material or the like.

There is a close relationship between the hot-melt characteristic and the softening point. In general, there is a tendency that the lower the softening point of the urethane prepolymer, the better the workability. On the other hand, the higher the softening point of the urethane prepolymer, the better the adhesion strength.

The softening point of the urethane prepolymer used in the present invention is preferably in the range of 40 to 120° C. When the softening point of the urethane prepolymer is within this range, it is possible to obtain a moisture-curable polyurethane hot-melt adhesive which has a good workability and shows excellent adhesive strength. Here, the softening point of the urethane prepolymer means a temperature at which heat flow starts and cohesive force is lost when the temperature of the urethane prepolymer is gradually increased.

Examples of a controlling method for adjusting the softening point of the urethane prepolymer, include: (1) a method wherein a softening point is controlled by adjusting the molecular weight thereof; (2) a method wherein the softening point is controlled by the crystallinity of a polyalkylene chain of polyesterpolyol, when polyesterpolyol is used as a raw material; (3) a method wherein the softening point is controlled by introducing an aromatic ring structure included in a polyol and/or polyisocyanate; and (4) a method wherein the softening point is controlled by adjusting the content of urethane bonds. These methods can be used alone or in combination of two or more.

Regarding the aforementioned method (1) for controlling the softening point of the urethane prepolymer, the softening point generally tends to increase in accordance with an increase of the molecular weight of the urethane prepolymer. The method for controlling the molecular weight of urethane prepolymer is not particularly limited in the present invention. Examples of the method for controlling the molecular weight thereof include: a method wherein adjustment of the molar ratios of polyisocyanate and polyol is conducted, and a method wherein high molecular weight polyol is used.

Regarding the aforementioned method (2) for controlling the softening point of the urethane prepolymer, there is a tendency that the larger the number of carbon atoms included in the polyalkylene chain of crystalline polyesterpolyol, the higher the crystallinity of the obtained urethane prepolymer, and as a result, the softening point increases. Furthermore, there is a tendency that the larger the amount of crystalline polyesterpolyol used, the higher the softening point of the urethane prepolymer.

Regarding the aforementioned method (3) for controlling the softening point of the urethane prepolymer (A), in general, there is a tendency that the larger the number of the aromatic rings in the urethane prepolymer, the higher the softening point of the urethane prepolymer.

Regarding the aforementioned method (4) for controlling the softening point of the urethane prepolymer, there is a tendency that the larger the number of urethane bonds, the higher the softening point.

The urethane prepolymer used in the present invention can be manufactured by a reaction of polyisocyanate and various kinds of polyols explained below, under the condition that an excess number of isocyanate groups are included in the polyisocyanate as compared with the number of hydroxyl groups included in the polyols.

In order to achieve the object of the present invention, it is important to use, as the aforementioned polyols, a combination of long-chain aliphatic polyester polyol (A) represented by the general formula (I), aliphatic polyether polyol (B) having a number average molecular weight of 3,000 to 15,000, and aromatic polyester polyol (CI) which has a number average molecular weight of 1,000 to 5,000 and has a glass transition temperature of 40° C. or more.

First, the long-chain aliphatic polyesterpolyol (A) is explained below.

The long-chain aliphatic polyesterpolyol (A) used for forming the aforementioned urethane prepolymer has the structure represented by the following general formula (I).

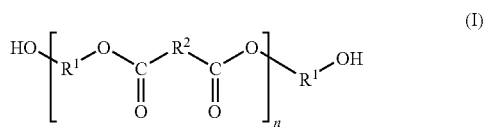

(In the general formula (I), $R^1$ and $R^2$ each independently represents a straight chain alkylene group wherein the number of carbon atoms in the group is an even number, the sum of the number of carbon atoms in $R^1$ and $R^2$ is 12 or more, and n represents a number from 3 to 40.)

Any group can be selected as $R^1$ of the general formula (I), insofar as the selected group is a straight chain alkylene group wherein the number of carbon atoms in the group is an even number and the sum of the number of carbon atoms in $R^1$ and $R^2$ is 12 or more. It is preferable that $R^1$ represents a straight chain alkylene group wherein the number of carbon atoms in the group is an even number of 4 or more.

Any group can be selected as $R^2$ of the general formula (I), insofar as the selected group is a straight chain alkylene group wherein the number of carbon atoms in the group is an even number and the sum of the number of carbon atoms in $R^1$ and $R^2$ is 12 or more. It is preferable that $R^2$ represents a straight chain alkylene group wherein the number of carbon atoms in the group is an even number of 10 or more.

When the long-chain aliphatic polyesterpolyol is used wherein both of the $R^1$ and $R^2$ are straight chain alkylene groups which include carbon atoms within the aforementioned number ranges, crystallinity of the obtained urethane prepolymer increases and it is possible to obtain a moisture-curable polyurethane hot-melt adhesive which can prevent the peeling of a sheet or film from complex portions of a substrate.

In the general formula (I), "n" is in the range of 3 to 40, preferably 9 to 25, and still more preferably 9 to 15. When the long-chain aliphatic polyesterpolyol is used wherein n is included in the aforementioned range, it is possible to obtain a moisture-curable polyurethane hot-melt adhesive which has adequate melting viscosity and shows excellent coating workability and can prevent the peeling of a sheet or the like from complex portions of a substrate from when a sheet or the like is pasted on a substrate with the adhesive to until final adhesive strength of the adhesive is achieved.

For example, the long-chain aliphatic polyesterpolyol (A) can be manufactured by a condensation reaction of a straight chain aliphatic diol wherein the number of carbon atoms is an even number and a straight chain aliphatic dicarboxylic acid wherein the number of carbon atom is also an even number. Examples of the straight chain aliphatic diol include: ethylene glycol, 1,4-butane diol, 1,6-hexane diol, 1,8-octane diol, and 10-decan diol. It is preferable that 1,6-hexane diol, 1,8-octane diol, 1, and/or 10-decan diol is used.

Examples of the straight chain aliphatic dicarboxylic acid include: succinic acid, adipic acid, sebacic acid, and dodecamethylene dicarboxylic acid. It is preferable that sebacic acid, dodecamethylene dicarboxylic acid, and/or 1,12-dodecane dicarboxylic acid is used.

Any combination of the straight chain aliphatic diol and the straight chain dicaroboxylic acid which are used for forming the long-chain aliphatic polyesterpolyol (A) can be selected preferably, insofar as the sum of the number of carbon atoms in $R^1$ and $R^2$ of the general formula (I) is 12 or more, and more preferably 12 to 20. Among them, it is preferable to use a long-chain aliphatic polyesterpolyol which is obtained by reacting a combination of 1,6-hexane diol as the straight chain aliphatic diol, and sebacic acid or 1,12-dodecane dicarboxylic acid as the straight chain aliphatic dicarboxylic acid.

It is preferable that the number average molecular weight of the long-chain aliphatic polyesterpolyol (A) is 10,000 or less, more preferably 2,000 to 8,000, and still more preferably 3,000 to 5,000.

It is preferable that 20 to 60 parts by mass of the long-chain aliphatic polyesterpolyol (A) is used based on the total amount (all amount) of polyol and polyisocyanate (100 parts by mass) which is used for manufacturing the aforementioned urethane prepolymer, and more preferably 20 to 40 parts by mass of the long-chain aliphatic polyesterpolyol (A) is used. When the aforementioned amount of the long-chain aliphatic polyesterpolyol (A) is used in combination with the various types of polyols described below, it is possible to achieve a suitable melting viscosity and excellent coating workability, and to prevent the peeling of a sheet or the like from complex portions of a substrate after the sheet or the like is pasted on the substrate with the adhesive.

Next, aliphatic polyetherpolyol (B) used in the present invention is explained below.

Examples of the aliphatic polyetherpolyol (B) include conventional aliphatic polyetherpolyols having a number average molecular weight of 3,000 to 15,000. For example, polyethylene glycol, polypropylene glycol, polybutylene glycol and/or the like can be used.

The aliphatic polyetherpolyol (B) can be manufactured by a ring opening reaction of an alkylene oxide such as ethylene oxide, propylene oxide and butylene oxide by using a low molecular weight polyol described below as an initiator. Furthermore, the aliphatic polyetherpolyol (B) can be manufactured by a ring opening addition of γ-butyrolactone, ε-caprolactone or the like to the polymer obtained by the aforementioned ring opening reaction.

Examples of low molecular weight polyols which can be used as an initiator for manufacturing the aliphatic polyetherpolyol (B) include: ethylene glycol, 1,2-propylene glycol, 1,3-propylene glycol, 1,3-butylene glycol, 1,4-butylene glycol, 2,2-dimethyl-1,3-propane diol, 1,6-hexane diol, 3-methyl-1,5-pentane diol, 1,8-octane diol, diethylene glycol, triethylene glycol, dipropylene glycol, and tripropylene glycol.

In order to further improve the final adhesive strength achieved by the moisture-curable polyurethane hot-melt adhesive of the present invention, it is preferable that polypropylene glycol or polybutylene glycol is used as the aliphatic polyetherpolyol (B).

In the present invention, it is necessary to use a comparatively high molecular weight compound wherein the number average molecular weight thereof is 3,000 or more as the aliphatic polyetherpolyol (B). However, polyetherpolyol having a secondary hydroxyl group at a terminal end(s) such as the aforementioned polypropylene glycol has a tendency that the reactivity thereof with polyisocyanate deteriorates in accordance with an increase in the molecular weight of the polyetherpolyol.

In order to reduce the deterioration of the reactivity of polyetherpolyol with polyisocyanates, it is effective to conduct a denaturation such that ethylene oxide is added to both ends of polypropylene glycol or the like to form primary hydroxyl groups at both ends. That is, from the viewpoint of obtaining a moisture-curable polyurethane hot-melt adhesive which achieves excellent final adhesive strength and excellent reactivity with polyisocyanate, it is preferable to use the ethylene oxide denatured polypropylene glycol and/or ethylene oxide denatured polybutylene glycol obtained by the aforementioned methods. In such cases, the content of the structural unit originating from the ethylene oxide of the obtained aliphatic polyetherpolyol is preferably 20% by mass or less based on the total amounts of the aliphatic polyetherpolyol, and more preferably 10% by mass or less. When the content is within this range, it is possible to increase the reactivity of polyetherpolyol with polyisocyanates without causing deterioration of the obtained excellent final adhesive strength. The lower limit of the content is not particularly limited, and it is preferable that the contents thereof is 2% by mass or more.

The aforementioned aliphatic polyetherpolyol (B) is a compound having a number average molecular weight in the range of 3,000 to 15,000, and more preferable in the range of 3,500 to 5,500. When the aliphatic polyetherpolyol (B) having the aforementioned number average molecular weight is used in combination with the long-chain aliphatic polyesterpolyol (A) and the aromatic polyesterpolyol (CI) explained below in detail, it is possible to obtain a moisture-curable polyurethane hot-melt adhesive which can achieve excellent final adhesive strength and prevent the peeling of a sheet or the like from complex portions of a substrate from when the sheet or the like is pasted on the substrate with the adhesive, until final adhesive strength of the adhesive is achieved.

It is preferable that 5 to 40 parts by mass of the aliphatic polyetherpolyol (B) is used for manufacturing the urethane prepolymer based on the total amount (100 parts by mass) of the polyol and polyisocyanate used for the aforementioned urethane prepolymer, more preferably 8 to 30 parts by mass, and still more preferably 10 to 20 parts by mass. When the aliphatic polyetherpolyol (B) included in the aforementioned range is used, it is possible to obtain a moisture-curable polyurethane hot-melt adhesive which can achieve excellent adhesive strength.

Next, aromatic polyesterpolyol (CI) which has a number average molecular weight of 1,000 to 5,000 and has a glass-transition temperature of 40° C. or more is explained below.

Examples of manufacturing methods of the aromatic polyesterpolyol (CI) include: a method wherein a condensation reaction of aromatic polycarboxylic acid and aliphatic polyol having a low molecular weight is conducted and a method wherein a condensation reaction of aliphatic polycarboxylic acid and aromatic polyol having a low molecular weight is conducted.

Examples of the aforementioned aromatic polycarboxylic acid which can be used for forming the aromatic polyesterpolyol (CI) include: phthalic acid, isophthalic acid, terephthalic acid, hexahydro isophthalic acid, and the like. These acids may be used singly or in combination of two or more. Examples of the aforementioned aliphatic polycarboxylic acid include: adipic acid, sebacic acid, azelaic acid, decamethylene carboxylic acid, and the like.

Examples of the aliphatic polyol having a low molecular weight include: ethylene glycol, 1,2-propylene glycol, 1,3-propylene glycol, 1,3-butylene glycol, 1,4-butylene glycol, 2,2-dimethyl-1,3-propane diol, 1,6-hexane diol, 3-methyl-1,5-pentane diol, 1,8-octane diol, diethylene glycol, triethylene glycol, dipropylene glycol, tripropylene glycol, and the like.

Examples of the aromatic polyol having a low molecular weight include: aromatic polyol obtained by a reaction which is a ring opening addition of ethylene oxide, propylene oxide, γ-butyrolactone, ε-caprolactone or the like to bisphenol A, bisphenol F or the like.

As the aromatic polyesterpolyol (CI), it is preferable to use aromatic polyesterpolyol obtained by a method wherein ethylene glycol and/or a neopentyl glycol as the aliphatic polyol having a low molecular weight and aromatic isophthalic acid and/or terephthalic acid as the aromatic polycarboxylic acid are prepared and then a conventional condensation reaction is conducted using those selected so that the glass-transition temperature of the aromatic polyesterpolyol (CI) obtained therefrom is 40° C. or more.

The aromatic polyesterpolyol (CI) has a glass-transition temperature of 40° C. or more, and more preferably in the range of 40 to 80° C. When the aromatic polyesterpolyol (CI) having the glass-transition temperature within the aforementioned range is used in combination with the aforementioned long-chain aliphatic polyesterpolyol (A) and the like, it is possible to obtain a moisture-curable polyurethane hot-melt adhesive which can prevent the peeling of a sheet or the like from complex portions of a substrate from when the sheet or the like is pasted on the substrate with the adhesive, until final adhesive strength of the adhesive is achieved.

It is preferable that 5 to 25 parts by mass of the aromatic polyesterpolyol (CI) is used for manufacturing the urethane prepolymer based on the total amount (100 parts by mass) of the polyol and polyisocyanate used, and it is more preferable that 10 to 25 parts by mass of the aromatic polyesterpolyol (CI) is used. When the aromatic polyesterpolyol (CI) is used in combination with aromatic polyesterpolyol (CII) described below, it is preferable that the aromatic polyesterpolyol (CI) is used in the range of 5 to 20 parts by mass, and more preferably in the range of 10 to 20 parts by mass.

When the urethane prepolymer of the present invention is manufactured, aromatic polyesterpolyol (CII), which has a number average molecular weight of 400 to 3,500 and has a glass-transition temperature of 20° C. or less, can be used as polyol in combination with the aforementioned long-chain aliphatic polyesterpolyol (A), the aliphatic polyetherpolyol (B) and the aromatic polyol (CI). Due to the aromatic polyesterpolyol (CII), it is possible to further improve the final adhesive strength achieved by the moisture-curable polyurethane hot-melt adhesive.

Examples of the aromatic polyesterpolyol (CII) include aromatic polyesterpolyol obtained by a reaction between polyol having a low molecular weight and a side chain(s) or the like, such as diethylene glycol, neopentyl glycol, hydroxy pivalic acid-2,2-dimethyl-3-hydroxy propyl and the like, and aromatic polycarboxylic acid which is similar to those cited as examples usable for manufacturing the aromatic polyesterpolyol (CI).

The aromatic polyesterpolyol (CII) has a glass-transition temperature of 20° C. or less. It is preferable that the aromatic polyesterpolyol (CII) has a glass-transition temperature in the range of −30 to 20° C. When the glass-transition temperature thereof is within this range, it is possible to obtain a moisture-curable polyurethane hot-melt adhesive which can achieve further excellent final adhesive strength.

It is preferable that the aromatic polyesterpolyol (CII) is used in the range of 5 to 20 parts by mass based on the total amount (100 parts by mass) of the polyol and polyisocyanate used for forming the aforementioned urethane prepolymer, and more preferably 10 to 20 parts by mass. Furthermore, it is preferable that the aromatic polyesterpolyol (CI) and the aromatic polyesterpolyol (CII) is used such that the sum is in the range of 10 to 35 parts by mass. When they are used in the aforementioned range, it is possible to obtain a moisture-curable polyurethane hot-melt adhesive which can achieve excellent final adhesive strength.

Other than the aforementioned polyol, other various polyols can be used as the polyol for forming the urethane polymer of the present invention, insofar as they do not inhibit the effects of the present invention. For example, polyesterpolyol other than the aromatic polyesterpolyol (CI), aromatic polyetherpolyol, acrylic polyol, polycarbonate polyol, polyolefin polyol, castor oil type polyol or the like can be used for the present invention.

Next, polyisocyanate which is used for manufacturing the aforementioned urethane prepolymer is explained below.

Examples of the polyisocyanate used in the present invention include: aromatic polyisocyanates such as 4,4'-diphenylmethane diisocyanate, 2,4'-diphenylmethane diisocyanate, carbodiimide denatured diphenylmethane diisocyanate, crude diphenylmethane diisocyanate, phenylene diisocyanate, thrylene diisocyanate, and naphthalene diisocyanate; polyisocyanates having aliphatic or alicyclic structure such as hexamethylene diisocyanate, lysine diisocyanate, cyclohexane diisocyanate, isophorone diisocyanate, dicyclohexyl methane diisocyanate, xylene diisocyanate, and tetramethyl xylene diisocyanate. Among them, since the moisture-curable polyurethane hot-melt adhesive of the present invention is used under the heat-melting condition, it is preferable that diphenylmethane diisocyanate which has a low vapor pressure at the time of heat-melting is used.

Next, the manufacturing method of urethane prepolymer used in the present invention is explained below in detail.

Urethane prepolymer used in the present invention can be manufactured by well-known conventional methods. For example, the urethane prepolymer can be manufactured by a method wherein the aforementioned polyisocyanate is provided in a reaction container, and then polyols from which moisture is removed, that is, long-chain aliphatic polyesterpolyol (A), aliphatic polyetherpolyol (B), aromatic polyesterpolyol (CI), and aromatic polyesterpolyol (CII) and the aforementioned other polyol which is added if required, are added dropwise to the reaction container independently or in a mixed state, and heating thereof is conducted until hydroxyl groups in the polyols do not exist substantially. The aforementioned manufacturing method can be conducted without using solvent in general, but it is possible to conduct manufacturing of the urethane prepolymer in organic solvent. When the reaction of manufacturing the urethane prepolymer is conducted in organic solvent, it is possible to use an organic solvent which does not inhibit the reaction such as ethyl acetate, n-butyl acetate, methyl ethyl ketone, and toluene, but it is necessary to remove the organic solvent after or in the middle of the reaction by any method such as heating under reduced pressure.

A urethane-modified catalyst can be used if required, when the aforementioned urethane prepolymer is manufactured. The catalyst can be added in any step of the aforementioned reaction optionally.

Examples of the urethane-modified catalyst include: nitrogen containing compounds such as triethylamine, triethyldiamine, and N-methyl morpholine; metal salts such as potassium acetate, zinc stearate and stannous octoate; and organic metal compounds such as dibutyltin dilaurate.

The usage ratio of the polyol and polyisocyanate used for manufacturing the urethane prepolymer of the present invention can be selected freely if required. The equivalent ratio of isocyanate groups in the polyisocyanate to hydroxyl groups in the polyol (hereinafter, referred to as the "(isocyanate group/hydroxyl group) equivalence ratio") is in the range of 1.1 to 5.0, and more preferably 1.3 to 4.0, and still more preferably 1.5 to 3.0. When the equivalence ratio is controlled within this range, a moisture-curable polyurethane hot-melt adhesive which is excellent in coating ability can be obtained.

It is preferable that the urethane prepolymer used in the present invention has a island-like phase separated structure, wherein there is a matrix which is urethane prepolymer mainly including structural units originating from long-chain aliphatic polyesterpolyol (A), and within this matrix, domains (regions) of urethane prepolymer mainly including structural units originating from aliphatic polyetherpolyol (B), domains of urethane prepolymer mainly including a structual unit originating from aromatic polyesterpolyol (CI) and domains of urethane prepolymer mainly including a structual unit originated from aromatic polyesterpolyol (CII) are dispersed independently. Due to the use of the urethane prepolymer having an island-like (sea-and-island-type pattern) phase separated structure, it is possible to obtain a moisture-curable polyurethane hot-melt adhesive which can prevent the peeling of a sheet or the like from complex portions of a substrate from when the sheet or the like is pasted on the substrate with the adhesive, until final adhesive strength of the adhesive is achieved, and to achieve excellent final adhesive strength.

The average domain diameter of the domains formed in the aforementioned matrix is preferably in the range of 1 to 1,000 μm, more preferably 1 to 500 μm, and still more preferably 1 to 100 μm. The average domain diameter described in the present invention is a value which is obtained by measuring the diameters of 200 domains with an optical microscope and then averaging the diameters.

The melt viscosity at 125° C. of the moisture-curable polyurethane hot-melt adhesive of the present invention is preferably in the range of 2,000 to 9,000 mPa·s. When the melt viscosity is included in this range, after the moisture-curable polyurethane hot-melt adhesive is used for pasting a sheet or a film on a substrate which is conventionally used for a decorative fixture member such as an architectural material, the sheet or the like can be peeled off from the substrate easily without causing problems on the surface thereof if peeling is conducted within a predetermined time (for example, about 5 minutes or less) after pasting.

In addition to the urethane prepolymer, the moisture-curable polyurethane hot-melt adhesive of the present invention can include suitably: additives such as a tackifier, curing catalyst, plasticizer, stabilizer, filler, dye, pigment, fluorescent whitening agent, silane coupling agent, wax and the like, and thermoplastic resin and the like, insofar as they do not inhibit the purpose of the present invention. These compounds are used singly or in combination of two or more.

Examples of tackifiers usable in the present invention include: rosin resins, rosin ester resins, hydrogenated rosin ester resins, terpene resins, terpene phenol resins, hydrogenated terpene resins, and petroleum resins such as C5 type aromatic resin, C9 type aliphatic resin, copolymer of the C5 type aromatic resin and the C9 type aliphatic resin and the like.

Examples of plasticizers usable in the present invention include: dibutyl phthalate, dioctyl phthalate, dicyclohexyl phthalate, diisooctyl phthalate, diisodecyl phthalate, dibenzyl phthalate, butyl benzyl phthalate, trioctyl phosphate, epoxy type plasticizer, toluene-sulfonyl amide, chloroparaffin, adipiate, and castor oil.

Examples of stabilizer usable in the present invention include: hindered phenol type compounds, benzotriazole type compounds, and hindered amine type compounds.

Examples of fillers usable in the present invention include: derivatives of silicic acid, talc, metal powder, calcium carbonate, clay and carbon black.

Next, the decorative fixture member of the present invention is explained.

A decorative fixture member of the present invention can be manufactured by pasting a sheet or film to a substrate such as those described below by using the aforementioned moisture-curable polyurethane hot-melt adhesive. For example, the decorative fixture member of the present invention can be used for treadboards of stairs, door frames, window frames, thresholds, handrails or the like.

Examples of the substrate usable in the present invention include: wooden substrates such as plywood, MDF (medium density fiberboard) and particle board, and metal substrates such as aluminum or iron substrate. The substrate may include complex portions such as a groove or ditch portion, an R portion or a reverse R portion.

Examples of sheets or film usable in the present invention include: paper, sliced veneer, metallic foil, and a sheet or the like obtained from a resin such as polyester, nylon, polystyrene, polycarbonate, polyvinyl chloride, a copolymer of ethylene and vinyl acetate, polyvinyl alcohol, polyethylene and polypropylene.

As the sheet or film usable in the present invention, it is possible to use those having decorative solid colors or various colors and/or having decorative patterns on the surface thereof. Moreover, primer processing may be performed to their back surfaces by using a resin or the like.

Examples of the method for pasting the sheet or film on the substrate with the moisture-curable polyurethane hot-melt adhesive of the present invention include: a method wherein the aforementioned moisture-curable polyurethane hot-melt adhesive is melted by heating in the range of 60 to 150° C., then the melted adhesive is coated on a substrate by using a roll coater, spray coater, T-die coater, knife coater or the like, and a sheet or the like is pasted on the coated substrate; and a method wherein the aforementioned melted adhesive is coated on a sheet or the like using the roll coater, and the substrate is pasted on the coated surface of the sheet or the like and bonding thereof is conducted suitably by roll pressing, flat pressing, belt pressing or the like in accordance with the shape of the substrate.

EXAMPLE

Hereinafter, the present invention is explained using examples in detail.

Synthetic Example 1

Manufacturing Example of Long-chain Aliphatic Polyesterpolyol (A-1))

In a 2 L flask, 1,150 parts by mass of 1,12-dodecane dicarboxylic acid (molecular weight: 230.30), 615 parts by mass of 1,6-hexane diol (molecular weight: 118.17) and 0.007 parts by mass of tetraisopropoxy titanium as an esterification catalyst were added, and then melted at 120° C. Subsequently, the temperature of the mixture was increased to 220° C. over 3 to 4 hours while stirring and it was maintained at this temperature for 4 hours. Then, the mixture was cooled at 100° C. to prepare long-chain aliphatic polyesterpolyol (A-1) (number average molecular weight: 3500, acid number: 0.4, hydroxyl value: 31.6).

Synthetic Example 2

Manufacturing Example of Long-chain Aliphatic Polyesterpolyol (A-2))

Except that 1,000 parts by mass of sebacic acid were used instead of 1,12-dodecane dicarboxylic acid of Synthetic Example 1, the reaction to prepare a long-chain aliphatic polyesterpolyol (A-2) (number average molecular weight: 3,000, acid number: 0.5, hydroxyl value: 31.5) was conducted similar to Synthetic Example 1.

Synthetic Example 3

Manufacturing Example of Aliphatic Polyesterpolyol (A'-3))

Except that 720 parts by mass of adipic acid were used instead of 1,12-dodecane dicarboxylic acid of Synthetic Example 1, the reaction to prepare long-chain aliphatic polyesterpolyol (A'-3) (number average molecular weight: 4,500, acid number: 0.1, hydroxyl value: 24.8) was conducted similar to Synthetic Example 1.

TABLE 1

| | | Synthetic Example 1 | Synthetic Example 2 | Synthetic Example 3 |
|---|---|---|---|---|
| Abbreviation | Parts by mass | A-1 | A-2 | A'-3 |
| Straight chain aliphatic diol | | | | |
| 1,6-hexane diol | | 615 | 615 | 615 |
| Straight chain aliphatic dicarboxylic acid | | | | |
| 1,12-Dodecane dicarboxylic acid | | 1,150 | | |
| Sebacic acid | | | 1,000 | |
| Adipic acid | | | | 720 |
| Sum of the number of carbon atoms in $R^1$ and $R^2$ of the general formula (I) | | 16 | 14 | 10 |
| Number average molecular weight | | 3,500 | 3,000 | 4,500 |

As the aliphatic polyetherpolyol, various polyetherpolyols (B-1) to (B'-7) described in the following Table 2 are used. In Table 2, PPG represents polypropylene glycol, and EO-PPG represents ethylene oxide denatured polypropylene glycol obtained by a ring opening addition wherein ethylene oxide is added to both terminal ends of polypropylene glycol.

TABLE 2

| | Abbreviation | | | | | | |
|---|---|---|---|---|---|---|---|
| | B-1 | B-2 | B-3 | B-4 | B'-5 | B'-6 | B'-7 |
| Polyetherpolyol | PPG | PPG | EO-PPG | PPG | PPG | PPG | PPG |
| Number average molecular weight | 3,000 | 4,000 | 5,000 | 10,000 | 700 | 1,000 | 2,000 |
| Ratio of a structural unit originating from ethylene oxide in polyetherpolyol (% by mass) | 0 | 0 | 10 | 0 | 0 | 0 | 0 |

Synthetic Example 4

Manufacturing Example of Aromatic Polyesterpolyol (CI-1))

In a 2 L four neck flask, 140 parts by mass of ethylene glycol, 170 parts by mass of neopentyl glycol, 350 parts by mass of isophthalic acid, 350 parts by mass of terephthalic acid and 0.03 parts by mass of tin butylate were added, and reacted at 220° C. to prepare aromatic polyesterpolyol (CI-1) having a glass-transition temperature of 55° C.

Synthetic Example 5

Manufacturing Example of Aromatic Polyesterpolyol (CI-2))

In a 2 L four neck flask, 125 parts by mass of ethylene glycol, 210 parts by mass of neopentyl glycol, 350 parts by mass of isophthalic acid, 280 parts by mass of terephthalic acid, 50 parts by mass of adipic acid and 0.03 parts by mass of tin butylate were added, and reacted at 220° C. to prepare aromatic polyesterpolyol (CI-2) having a glass-transition temperature of 40° C.

Synthetic Example 6

Manufacturing Example of Aromatic Polyesterpolyol (CII-1))

In a 2 L four neck flask, 450 parts by mass of 1,5-pentane diol and 550 parts by mass of o-phthalic acid and furthermore 0.03 parts by mass of tin butylate were added, and reacted at 220° C. to prepare aromatic polyesterpolyol (CII-1) having a glass-transition temperature of 20° C. or less.

TABLE 3

| | | Synthetic Example 4 | Synthetic Example 5 | Synthetic Example 6 |
|---|---|---|---|---|
| Abbreviation | | CI-1 | CI-2 | CII-1 |
| Aliphatic polyol | (parts | | | |
| Ethylene glycol | by mass) | 140 | 125 | |
| Neopentyl glycol | | 170 | 210 | |
| 1,5-Pentane diol | | | | 450 |
| Aromatic polycarboxylic acid | | | | |
| o-Phthalic acid | | | | 550 |
| Isophthalic acid | | 350 | 350 | |
| Terephthalic acid | | 350 | 280 | |
| Adipic acid | | | 50 | |
| Number average molecular weight | | 3,000 | 3,200 | 1,000 |
| Glass-transition temperature (° C.) | | 55 | 40 | 20 or less |

Example 1

In a 1 L four neck flask, 150 parts by mass of the polyetherpolyol (B-1), 450 parts by mass of the long-chain aliphatic polyesterpolyol (A-1) and 200 parts by mass of the aromatic polyesterpolyol (CI-1) were heated at 100° C. under reduced pressure, and dehydration was conducted until the water content therein became 0.05% by mass based on the total contents included in the flask due to the dehydration.

Then, the obtained mixture was cooled at 70° C., and 200 parts by mass of carbodiimide denatured diphenylmethane diisocyanate were added to the mixture, and the mixture was heated at 100° C. and reacted for 3 hours to prepare a urethane prepolymer until the contents of the isocyanate group therein become constant.

Subsequently, the obtained urethane prepolymer was mixed with 50 parts by mass of SUPER ESTER A100 (rosin ester, manufactured by Arakawa Chemical Industries, Ltd.) as a tackifier to prepare a moisture-curable polyurethane hot-melt adhesive. Melting viscosity of the moisture-curable polyurethane hot-melt adhesive molten (heated at 125° C.) was measured with an ICI type cone plate viscometer (manufactured by ICI Co., Ltd., cone diameter: 19.5 mm, cone angle: 2.0°), and it was 6,500 mPa·s. Furthermore, the obtained moisture-curable polyurethane hot-melt adhesive was put in a 150 cm$^3$ bottle and heat-melted. It was observed that the moisture-curable polyurethane hot-melt adhesive in a molten state became white and cloudy.

Hereinafter, the melting viscosities obtained in Examples and Comparative Examples are values measured by the same conditions of the aforementioned method.

Figure 2:
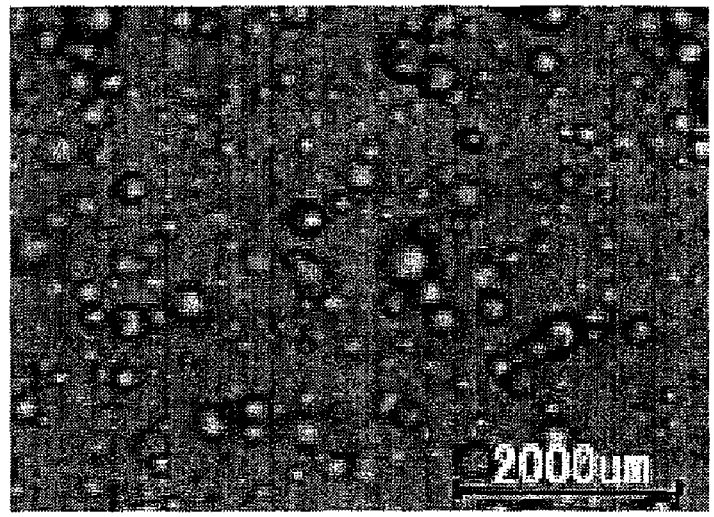
FIG. 2 is a polarization microscope photograph which shows a moisture-curable polyurethane hot-melt adhesive obtained in Example 1 which has an island like phase separated structure in a molten state.
Figure 3:
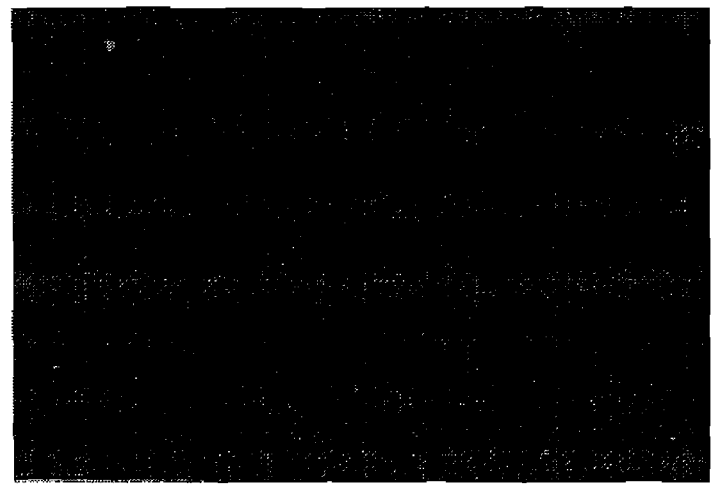
FIG. 3 is a polarization microscope photograph which shows a moisture-curable polyurethane hot-melt adhesive obtained in Comparative Example 2 which has a uniform structure in a molten state.

Moreover, the obtained moisture-curable polyurethane hot-melt adhesive was heat-melted at about 107° C. and coated on a slide, and the slide was heated at 100° C. to observe a molten state of the moisture-curable polyurethane hot-melt adhesive with a polarization microscope. An island-like phase separated structure was observed as shown in FIG. 2.

Example 2

In a 1 L four neck flask, 200 parts by mass of the polyetherpolyol (B-2), 200 parts by mass of the long-chain aliphatic polyesterpolyol (A-1), 150 parts by mass of aliphatic polyesterpolyol (A'-3) and 150 parts by mass of the aromatic polyesterpolyol (CI-1) were heated at 100° C. under reduced pressure, and dehydration was conducted until the water content therein became 0.05% by mass based on the total contents included in the flask after the dehydration.

Then, the obtained mixture was cooled at 70° C. and 140 parts by mass of 4,4'-diphenylmethane diisocyanate was added to the mixture, and the mixture was heated at 100° C. and reacted for about 3 hours to prepare a urethane prepolymer until the contents of the isocyanate group therein become constant.

Subsequently, the obtained urethane prepolymer was mixed with 0.5 parts by mass of U-CAT660M (2,2'-dimorpholino diethyl ether, manufactured by San-Apro Ltd.) as a curing catalyst to prepare a moisture-curable polyurethane hot-melt adhesive. Melting viscosity of the moisture-curable polyurethane hot-melt adhesive was 9,000 mPa·s, and it was observed that the moisture-curable polyurethane hot-melt adhesive in a molten state became white and cloudy.

Example 3

In a 1 L four neck flask, 150 parts by mass of the polyetherpolyol (B-3), 200 parts by mass of the long-chain aliphatic polyesterpolyol (A-1), 150 parts by mass of the long-chain aliphatic polyesterpolyol (A-2), 80 parts by mass of the aliphatic polyesterpolyol (A'-3), 200 parts by mass of the aromatic polyesterpolyol (CI-1), and 50 parts by mass of the aromatic polyesterpolyol (CII-1) were heated at 100° C. under reduced pressure, and dehydration was conducted until the water content therein became 0.05% by mass based on the total contents included in the flask after the dehydration.

Then, the obtained mixture was cooled at 70° C., and 170 parts by mass of 4,4'-diphenylmethane diisocyanate were added to the mixture, and the mixture was heated at 100° C. and reacted for about 3 hours to prepare a urethane prepolymer until the contents of isocyanate group therein become constant.

Subsequently, the obtained urethane prepolymer was mixtured with 0.5 parts by mass of U-CAT660M (2,2'-dimorpholino diethyl ether, manufactured by San-Apro Ltd.) and 50 parts by mass of SUPER ESTER A100 (rosin ester, manufactured by Arakawa Chemical Industries, Ltd.) to prepare a moisture-curable polyurethane hot-melt adhesive. Melting viscosity of the moisture-curable polyurethane hot-melt adhesive was 7,000 mPa·s and it was observed that the moisture-curable polyurethane hot-melt adhesive in a molten state became white and cloudy.

Example 4

In a 1 L four neck flask, 150 parts by mass of the polyetherpolyol (B-4), 50 parts by mass of the polyetherpolyol (B'-6), 200 parts by mass of the long-chain aliphatic polyesterpolyol (A-1), 150 parts by mass of the aliphatic polyesterpolyol (A'-3), 150 parts by mass of the aromatic polyesterpolyol (CI-1) and 100 parts by mass of the aromatic polyesterpolyol (CII-1) were heated at 100° C. under reduced pressure, and dehydration was conducted until the water content therein became 0.05% by mass based on the total contents included in the flask after the dehydration.

Then, the obtained mixture was cooled at 70° C., and 155 parts by mass of 4,4'-diphenylmethane diisocyanate were added to the mixture, and the mixture was heated at 100° C. and reacted for about 3 hours to prepare a urethane prepolymer until the contents of the isocyanate group therein become constant.

Subsequently, the obtained urethane prepolymer was mixed with 0.5 parts by mass of U-CAT660M (2,2'-dimorpholino diethyl ether, manufactured by San-Apro Ltd.) to prepare a moisture-curable polyurethane hot-melt adhesive. Melting viscosity of the moisture-curable polyurethane hot-melt adhesive was 8,000 mPa·s and it was observed that the moisture-curable polyurethane hot-melt adhesive in a molten state became white and cloudy.

Example 5

In a 1 L four neck flask, 100 parts by mass of the polyetherpolyol (B-3), 50 parts by mass of the polyetherpolyol (B-4), 50 parts by mass of the polyetherpolyol (B'-5), 200 parts by mass of the long-chain aliphatic polyesterpolyol (A-1), 200 parts by mass of the long-chain aliphatic polyesterpolyol (A-2), 150 parts by mass of the aromatic polyesterpolyol (CI-1) and 70 parts by mass of the aromatic polyesterpolyol (CII-1) were heated at 100° C. under reduced pressure, and dehydration was conducted until the water content therein became 0.05% by mass based on the total contents included in the flask due to the dehydration.

Then, the obtained mixture was cooled at 70° C., and 230 parts by mass of carbodiimide denatured diphenylmethane diisocyanate were added to the mixture, and the mixture was heated at 100° C. and reacted for about 3 hours to prepare a urethane prepolymer until the contents of the isocyanate group therein become constant.

Subsequently, the obtained urethane prepolymer was mixed with 1 part by mass of U-CAT660M (2,2'-dimorpholino diethyl ether, manufactured by San-Apro Ltd.) and 50 parts by mass of SUPER ESTER A100 (rosin ester, manufactured by Arakawa Chemical Industries, Ltd.) to prepare a moisture-curable polyurethane hot-melt adhesive. Melting viscosity of the moisture-curable polyurethane hot-melt adhesive was 8,000 mPa·s and it was observed that the moisture-curable polyurethane hot-melt adhesive in a molten state became white and cloudy.

Example 6

In a 1 L four neck flask, 150 parts by mass of the polyetherpolyol (B-1), 200 parts by mass of the long-chain aliphatic polyesterpolyol (A-1), 180 parts by mass of the long-chain aliphatic polyesterpolyol (A-2), 200 parts by mass of the aromatic polyesterpolyol (CI-2) and 100 parts by mass of the aromatic polyesterpolyol (CII-1) were heated at 100° C. under reduced pressure, and dehydration was conducted until water content therein became 0.05% by mass based on the total contents included in the flask after the dehydration.

Then, the obtained mixture was cooled at 70° C., and 170 parts by mass of 4,4'-diphenylmethane diisocyanate were added to the mixture, and the mixture was heated at 100° C. and reacted for about 3 hours to prepare a urethane prepolymer until the contents of isocyanate group therein become constant.

Subsequently, the obtained urethane prepolymer was used to prepare a moisture-curable polyurethane hot-melt adhesive. Melting viscosity of the moisture-curable polyurethane hot-melt adhesive was 6,000 mPa·s and it was observed that the moisture-curable polyurethane hot-melt adhesive in a molten state became white and cloudy.

Comparative Example 1

In a 1 L four neck flask, 200 parts by mass of the polyetherpolyol (B-3), 200 parts by mass of the aliphatic polyesterpolyol (A'-3), 300 parts by mass of the aromatic polyesterpolyol (CI-1) and 100 parts by mass of the aromatic polyesterpolyol (CII-1) were heated at 100° C. under reduced pressure, and dehydration was conducted until the water content therein became 0.05% by mass based on the total contents included in the flask after the dehydration.

Then, the obtained mixture was cooled at 70° C., and 200 parts by mass of carbodiimide denatured diphenylmethane diisocyanate were added to the mixture, and the mixture was heated at 100° C. and reacted for about 3 hours to prepare a urethane prepolymer until the contents of isocyanate group therein become constant.

Subsequently, the obtained urethane prepolymer was used to prepare a moisture-curable polyurethane hot-melt adhesive. Melting viscosity of the moisture-curable polyurethane hot-melt adhesive was 8,500 mPa·s and it was observed that the moisture-curable polyurethane hot-melt adhesive in a molten state became white and cloudy.

Comparative Example 2

In a 1 L four neck flask, 650 parts by mass of the long-chain aliphatic polyesterpolyol (A-1) and 220 parts by mass of the aliphatic polyesterpolyol (A'-3) were heated at 100° C. under reduced pressure, and dehydration was conducted until the water content therein became 0.05% by mass based on the total contents included in the flask after the dehydration.

Then, the obtained mixture was cooled at 70° C., and 130 parts by mass of 4,4'-diphenylmethane diisocyanate were added to the mixture, and the mixture was heated at 100° C. and reacted for about 3 hours to prepare a urethane prepolymer until the contents of the isocyanate group therein become constant.

Subsequently, the obtained urethane prepolymer was mixed with 0.5 parts by mass of U-CAT660M (2,2'-dimorpholino diethyl ether, manufactured by San-Apro Ltd.) and 50 parts by mass of SUPER ESTER A100 (rosin ester, manufactured by Arakawa Chemical Industries, Ltd.) to prepare a moisture-curable polyurethane hot-melt adhesive. Melting viscosity of the moisture-curable polyurethane hot-melt adhesive was 4,000 mPa·s, and it was observed that the moisture-curable polyurethane hot-melt adhesive in the molten state was transparent.

Moreover, the obtained moisture-curable polyurethane hot-melt adhesive was heat-melted and coated on a slide, and the slide was heated at 100° C. to observe a molten state of the moisture-curable polyurethane hot-melt adhesive with a polarization microscope. An island like phase separated structure as shown in FIG. 2 was not observed.

Comparative Example 3

In a 1 L four neck flask, 600 parts by mass of the long-chain aliphatic polyesterpolyol (A-1) and 220 parts by mass of the aromatic polyesterpolyol (CI-1) were heated at 100° C. under reduced pressure, and dehydration was conducted until the water content therein became 0.05% by mass based on the total contents included in the flask after the dehydration.

Then, the obtained mixture was cooled at 70° C., and 180 parts by mass of carbodiimide denatured diphenylmethane diisocyanate were added to the mixture, and the mixture was heated at 100° C. and reacted for about 3 hours to prepare a urethane prepolymer until the contents of the isocyanate group therein become constant. Subsequently, the obtained urethane prepolymer was used to prepare a moisture-curable polyurethane hot-melt adhesive. Melting viscosity of the moisture-curable polyurethane hot-melt adhesive was 12,000 mPa·s, and it was observed that the moisture-curable polyurethane hot-melt adhesive in the molten state was transparent.

Comparative Example 4

In a 1 L four neck flask, 300 parts by mass of the polyetherpolyol (B-3), 200 parts by mass of the long-chain aliphatic polyesterpolyol (A-1) and 300 parts by mass of the aromatic polyesterpolyol (CII-1) were heated at 100° C. under reduced pressure, and dehydration was conducted until the water content therein became 0.05% by mass based on the total contents included in the flask after the dehydration.

Then, the obtained mixture was cooled at 70° C., and 200 parts by mass of carbodiimide denatured diphenylmethane diisocyanate were added to the mixture, and the mixture was heated at 100° C. and reacted for about 3 hours to prepare a urethane prepolymer until the contents of the isocyanate group therein become constant.

Subsequently, the obtained urethane prepolymer was stirred uniformly with 50 parts by mass of SUPER ESTER A100 (rosin ester, manufactured by Arakawa Chemical Industries, Ltd.) to prepare a moisture-curable polyurethane hot-melt adhesive. Melting viscosity of the moisture-curable polyurethane hot-melt adhesive was 13,000 mPa·s, and it was observed that the moisture-curable polyurethane hot-melt adhesive in the molten state became white and cloudy.

Comparative Example 5

In a 1 L four neck flask, 150 parts by mass of the polyetherpolyol (B'-5), 500 parts by mass of the long-chain aliphatic polyesterpolyol (A'-3) and 150 parts by mass of the aromatic polyesterpolyol (CII-1) were heated at 100° C. under reduced pressure, and dehydration was conducted until the water content therein became 0.05% by mass based on the total contents included in the flask after the dehydration.

Then, the obtained mixture was cooled at 70° C., and 200 parts by mass of carbodiimide denatured diphenylmethane diisocyanate were added to the mixture, and the mixture was heated at 100° C. and reactes for about 3 hours until the contents of isocyanate group therein become constant, and an urethane prepolymer was prepared. Subsequently, the obtained urethane prepolymer was used to prepare a moisture-curable polyurethane hot-melt adhesive. Melting viscosity of the moisture-curable polyurethane hot-melt adhesive was 20,000 mPa·s, and it was observed that the moisture-curable polyurethane hot-melt adhesive in a molten state was transparent.

Comparative Example 6

In a 1 L four neck flask, 200 parts by mass of the polyetherpolyol (B'-6), 200 parts by mass of the long-chain aliphatic polyesterpolyol (A-1), 150 parts by mass of the aliphatic polyesterpolyol (A'-3), 150 parts by mass of the aromatic polyesterpolyol (CI-1) and 100 parts by mass of the aromatic polyesterpolyol (CII-1) were heated at 100° C. under reduced pressure, and dehydration was conducted until the water content therein became 0.05% by mass based on the total contents included in the flask after the dehydration. Then, the obtained mixture was cooled at 70° C., and 170 parts by mass of 4,4'-diphenylmethane diisocyanate were added to the mixture, and the mixture was heated at 100° C. and reacted for about 3 hours to prepare a urethane prepolymer until the contents of the isocyanate group therein become constant.

Subsequently, the obtained urethane prepolymer was used to prepare a moisture-curable polyurethane hot-melt adhesive. Melting viscosity of the moisture-curable polyurethane hot-melt adhesive was 16,000 mPa·s, and it was observed that the moisture-curable polyurethane hot-melt adhesive in a molten state became white and cloudy.

Comparative Example 7

In a 1 L four neck flask, 200 parts by mass of the polyetherpolyol (B'-7), 200 parts by mass of the long-chain aliphatic polyesterpolyol (A-1), 150 parts by mass of the aliphatic polyesterpolyol (A'-3), 150 parts by mass of the aromatic polyesterpolyol (CI-1) and 100 parts by mass of the aromatic polyesterpolyol (CII-1) were heated at 100° C. under reduced pressure, and dehydration was conducted until the water content therein became 0.05% by mass based on the total contents included in the flask after the dehydration.

Then, the obtained mixture was cooled at 70° C., and 140 parts by mass of 4,4'-diphenylmethane diisocyanate were added to the mixture, and the mixture was heated at 100° C. and reacted for about 3 hours to prepare a urethane prepolymer until the contents of the isocyanate group therein become constant.

Subsequently, the obtained urethane prepolymer was used to prepare a moisture-curable polyurethane hot-melt adhesive. Melting viscosity of the moisture-curable polyurethane hot-melt adhesive was 12,000 mPa·s, and it was observed that the moisture-curable polyurethane hot-melt adhesive in a molten state became white and cloudy.

(Production of a Decorative Fixture Member)

Each moisture-curable polyurethane hot-melt adhesive obtained in the Examples and Comparative Examples was melted at 110° C. for one hour with a melting device (MC-12, manufactured by Nordson Corporation). On the other hand, polypropylene sheets having a thickness of 180 μm wherein a wood grain-like pattern was printed on one surface and primer processing was performed on the other surface (the reverse face) were prepared. Then, each heat-molten moisture-curable polyurethane hot-melt adhesive was coated on each sheet as follows. The sheet was fed from a profile laminater PL-300-PUR (PUR wrapping machine, manufactured by Marunaka Tekkosho Inc.,) at a rate of 40 m/minute, and the molten adhesive was coated at a thickness of 40 μm on the reverse face of the sheet with a T-die coater (EP51, manufactured by Nordson Corporation) wherein the temperature thereof was adjusted to 120° C. Immediately after coating, the film was pasted on a substrate of MDF (medium density fiber board) shown in FIG. 1 according to the shape of the substrate, and press bonding thereof was conducted with press bonding rollers. Evaluation results such as initial adhesive strength, adhesion state or the like of the obtained decorative fixture members are shown in Tables 4 and 5.

(Adhesion State)

After pasting the substrate and the polypropylene sheet and applying pressure for bonding, they were maintained for 24 hours in an environment where the temperature was 23° C. and the relative humidity was 65%. Subsequently, it was observed whether or not blistering or peeling were caused at the positions of groove or ditch portions, reverse R portions, or the like. These portions correspond to "groove or ditch portion (2)" and "a reverse R portion (1)" of the substrate shown in FIG. 1.

◯: There are no unsuitable exterior portions such as blistering or peeling.

Δ: There are unsuitable exterior portions such as blistering or peeling in a part of the decorative fixture member.

X: There are unsuitable exterior portions such as blistering or peeling all over the surface of the decorative fixture member.

(Initial Adhesive Strength)

After pasting the substrate and the polypropylene sheet and applying pressure for bonding, they were maintained for 3 minutes in an environment where the temperature was 23° C. and the relative humidity was 65%. Subsequently, peeling strength was evaluated by a 180° tensile test by using a plane part of the obtained decorative fixture member, that is, by using a part corresponding to a plane part (3) of the substrate shown in FIG. 1. The aforementioned 180° tensile test was conducted with a tensile tester (STD-201NA, manufactured by Imada Seisakusho Corporation) in the same environment and a tensile speed of 200 mm/minute. Initial adhesive strength required for the moisture-curable polyurethane hot-melt adhesive can be varied in accordance with the required application thereof. In general, it has been recognized that initial adhesive strength in the range of about 5 to 10 N/25 mm is sufficient for the adhesive to be used for architectural members and to make it possible to recycle the substrate.

(Final Adhesive Strength)

After pasting the substrate and the polypropylene sheet together and applying pressure for bonding, they were maintained for 24 hours in an environment where the temperature was 23° C. and the relative humidity was 65%. Subsequently, peeling strength was evaluated by a 180° tensile test by using a plane part of the obtained decorative fixture member, that is, using a part corresponding to a plane part (3) of the substrate shown in FIG. 1. The aforementioned 180° tensile test was conducted with the tensile tester (STD-201NA, manufactured by Imada Seisakusho Corporation) in the same environment and at a tensile speed of 200 mm/minute. Final adhesive strength required for the moisture-curable polyurethane hot-melt adhesive can be varied in accordance with the required application thereof. In general, it has been recognized that final adhesive strength which is about 20 N/25 mm or more is a sufficient to be used for architectural members.

(Evaluation Criteria of Recycling of a Substrate)

Immediately after pasting the substrate and the polypropylene sheet and applying pressure for bonding, separation of the sheet from the substrate was conducted. Then, by a method similar to the aforementioned production of a decorative fixture member, another polypropylene sheet was pasted on the substrate from which the polypropylene sheet had been peeled, and pressed for bonding to form a decorative fixture member (recycled product). The surface condition of the recycled decorative fixture members was observed visually, and those having excellent surface smoothness were evaluated as "possible" to recycle, and those having remarkable unevenness on the surface thereof were evaluated as "impossible" to recycle.

TABLE 4

|  |  |  | Ex. 1 | Ex. 2 | Ex. 3 | Ex. 4 | Ex. 5 | Ex. 6 |
|---|---|---|---|---|---|---|---|---|
| Long-chain aliphatic polyesterpolyol (A) | A-1 | (parts by mass) | 450 | 200 | 200 | 200 | 200 | 200 |
|  | A-2 |  | — | — | 150 | — | 200 | 180 |
| Aliphatic polyesterpolyol | A'-3 |  | — | 150 | 80 | 150 | — | — |
| Polyetherpolyol (B) | B-1 |  | 150 | — | — | — | — | 150 |
|  | B-2 |  | — | 200 | — | — | — | — |
|  | B-3 |  | — | — | 150 | — | 100 | — |
|  | B-4 |  | — | — | — | 150 | 50 | — |
| Polyetherpolyol | B'-5 |  | — | — | — | — | 50 | — |
|  | B'-6 |  | — | — | — | 50 | — | — |
|  | B'-7 |  | — | — | — | — | — | — |
| Aromatic polyesterpolyol (CI) | CI-1 |  | 200 | 150 | 200 | 150 | 150 | — |
|  | CI-2 |  | — | — | — | — | — | 200 |
| Aromatic polyesterpolyol (CII) | CII-1 |  | — | 100 | 50 | 100 | 70 | 100 |
| Polyisocyanate | 4,4'-MDI |  | — | 140 | 170 | 155 | — | 170 |
|  | Carbodiimide denatured MDI |  | 200 | — | — | — | 230 | — |
| Additives | SUPER ESTER A100 |  | 50 | — | 50 | — | 50 | — |
|  | UCAT-660M |  | — | 0.5 | 0.5 | 0.5 | 1 | — |
| Melting viscosity: mPa·s/125° C. |  |  | 6,500 | 9,000 | 7,000 | 8,000 | 8,000 | 6,000 |
| Melting condition |  |  | white & cloudy | white & cloudy | white & cloudy | white & cloudy | white & cloudy | white & cloudy |
| Evaluation of decorative fixture member | Adhesive condition |  | ○ | ○ | ○ | ○ | ○ | ○ |
|  | Initial adhesive strength (N/25 mm) |  | 9 | 5 | 7 | 9 | 9 | 10 |
|  | Recycling of substrate |  | possible | possible | possible | possible | possible | possible |
|  | Final adhesive strength (N/25 mm) |  | 28 | 40 | 31 | 40 | 39 | 45 |

In Table 4, "4,4'-MDI" represents 4,4'-diphenylmethane diisocyanate, and "carbodiimide denatured MDI" represents carbodiimide denatured diphenylmethane diisocyanate.

TABLE 5

|  |  |  | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|---|
| Long-chain aliphatic polyesterpolyol (A) | A-1 | (part by mass) | — | 650 | 600 | 200 | — | 200 | 200 |
|  | A-2 |  | — | — | — | — | — | — | — |
| Aliphatic polyesterpolyol | A'-3 |  | 200 | 220 | — | — | 500 | 150 | 150 |
| Polyetherpolyol (B) | B-1 |  | — | — | — | — | — | — | — |
|  | B-3 |  | 200 | — | — | 300 | — | — | — |
| Polyetherpolyol | B'-5 |  | — | — | — | — | 150 | — | — |
|  | B'-6 |  | — | — | — | — | — | 200 | — |
|  | B'-7 |  | — | — | — | — | — | — | 200 |
| Aromatic polyesterpolyol (CI) | CI-1 |  | 300 | — | 220 | — | — | 150 | 150 |
|  | CI-2 |  | — | — | — | — | — | — | — |
| Aromatic polyesterpolyol (CII) | CII-1 |  | 100 | — | — | 300 | 150 | 100 | 100 |
| Polyisocyanate | 4,4'-MDI |  | — | 130 | — | — | — | 170 | 140 |
|  | Carbodiimide denatured MDI |  | 200 | — | 180 | 200 | 200 | — | — |
| Additives | SUPER ESTER A100 |  | — | 50 | — | 50 | — | — | — |
|  | UCAT-660M |  | — | 0.5 | — | — | — | — | — |
| Melting viscosity: mPa·s/125° C. |  |  | 8,500 | 4,000 | 12,000 | 13,000 | 20,000 | 16,000 | 12,000 |
| Melting condition |  |  | white & cloudy | transparent | transparent | white & cloudy | transparent | white & cloudy | white & cloudy |
| Evaluation of decorative fixture member | Adhesive condition |  | x | ○ | ○ | x | x | x | x |
|  | Initial adhesive strength (N/25 mm) |  | 6 | 5 | 2 | 18 | 25 | 18 | 15 |
|  | Recycling of Substrate |  | possible | possible | possible | impossible | impossible | impossible | impossible |
|  | Final adhesive strength (N/25 mm) |  | 12 | 12 | 10 | 34 | 30 | 23 | 25 |

In Table 5, "4,4'-MDI" represents 4,4'-diphenylmethane diisocyanate, and "carbodiimide denatured MDI" represents carbodiimide denatured diphenylmethane diisocyanate.

INDUSTRIAL APPLICABILITY

The present invention provides a moisture-curable polyurethane hot-melt adhesive which shows excellent final adhesive strength and causes no peeling of a sheet or film from a substrate having complex portions when the sheet or a film is pasted to the substrate with the adhesive. Furthermore, it is possible to remove the sheet or the like from the substrate easily when peeling is conducted within a predetermined time, and therefore the substrate can be recycled.

The invention claimed is:

1. A moisture-curable polyurethane hot-melt adhesive, which comprises urethane prepolymer obtained by a reaction between polyisocyanate and polyols, wherein the polyols comprise:

long-chain aliphatic polyester polyol (A) represented by a general formula (I); aliphatic polyether polyol (B) having a number average molecular weight of 3,000 to 15,000; aromatic polyester polyol (CI) which has a number average molecular weight of 1,000 to 5,000 and has a glass-transition temperature of 40° C. or more, and aromatic polyester polyol (CII) which has a number average molecular weight of 400 to 3,500, a glass-transition temperature of 20° C. or less, wherein said aromatic polyester polyol (CII) is obtained by a reaction between a polyol having a low molecular weight and a side chain(s), and o-phthalic acid,

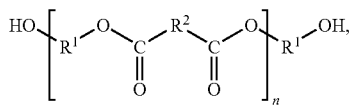

(I)

wherein $R^1$ and $R^2$ each independently represents a straight chain alkylene group wherein the number of carbon atoms in the group is an even number, the sum of the number of carbon atoms in $R^1$ and $R^2$ is 12 or more, and n represents a number of 3 to 40.

2. The moisture-curable polyurethane hot-melt adhesive according to claim 1, wherein the aliphatic polyetherpolyol (B) is a polypropylene glycol or polybutylene glycol, which has a number average molecular weight of 3,000 to 15,000.

3. The moisture-curable polyurethane hot-melt adhesive according to claim 1, wherein the aliphatic polyetherpolyol (B) is ethylene oxide denatured polypropylene glycol or ethylene oxide denatured polybutylene glycol, which is obtained by adding ethylene oxide to both terminal ends of polypropylene glycol or polybutylene glycol.

4. The moisture-curable polyurethane hot-melt adhesive according to claim 3, wherein the aliphatic polyetherpolyol (B) comprises 20% by mass or less of structural units originating from ethylene oxide based on the total amount of the aliphatic polyetherpolyol (B).

5. The moisture-curable polyurethane hot-melt adhesive according to claim 1, wherein the adhesive is obtained by a reaction of the polyisocyanate and the polyols, which comprises 20 to 60 parts by mass of the long-chain aliphatic polyester polyol (A), 5 to 40 parts by mass of the aliphatic polyether polyol (B) and 5 to 25 parts by mass of the aromatic polyester polyol (CI) based on 100 parts by mass of the total amount of the polyol and the polyisocyanates.

6. The moisture-curable polyurethane hot-melt adhesive according to claim 1, wherein
the adhesive is obtained by a reaction of the polyisocyanate and the polyols, which comprises 20 to 60 parts by mass of the long-chain aliphatic polyester polyol (A), 5 to 40 parts by mass of the aliphatic polyether polyol (B), 5 to 20 parts by mass of the aromatic polyester polyol (CI) and 5 to 20 parts by mass of the aromatic polyesterpolyol (CII), wherein the sum of the polyols (CI) and (CII) is in the range of 10 to 35 parts by mass, based on 100 parts by mass of the total amount of the polyol and the polyisocyanates.

7. The moisture-curable polyurethane hot-melt adhesive according to claim 1, wherein the urethane prepolymer comprises an island like phase separated structure.

8. The moisture-curable polyurethane hot-melt adhesive according to claim 1, wherein the melt viscosity at 125° C. of the adhesive is in the range of 2,000 to 9,000 mPa·s.

9. A decorative fixture member, which is obtained by pasting a sheet or film on a substrate with the moisture-curable polyurethane hot-melt adhesive according to claim 1.

10. A moisture-curable polyurethane hot-melt adhesive according to claim 1, wherein the initial adhesive strength as measured by a 180° tensile test is within a range of 5 to 10 N/25 mm.

* * * * *